United States Patent
Halvarsson et al.

(10) Patent No.: US 9,794,163 B2
(45) Date of Patent: Oct. 17, 2017

(54) ENHANCED PEER DISCOVERY IN A MESH NETWORK

(71) Applicant: TERRANET AB, Lund (SE)

(72) Inventors: Stig Halvarsson, Lund (SE);
Monthadar Al Jaberi, Malmö (SE)

(73) Assignee: TERRANET AB, Lund (SE)

(*) Notice: Subject to any disclaimer, the term of this patent is extended or adjusted under 35 U.S.C. 154(b) by 80 days.

(21) Appl. No.: 14/748,695

(22) Filed: Jun. 24, 2015

(65) Prior Publication Data
US 2016/0380872 A1 Dec. 29, 2016

(51) Int. Cl.
*H04L 12/751* (2013.01)
*H04W 24/08* (2009.01)
*H04W 84/18* (2009.01)
*H04W 40/24* (2009.01)

(52) U.S. Cl.
CPC ............. *H04L 45/02* (2013.01); *H04W 24/08* (2013.01); *H04W 40/248* (2013.01); *H04W 84/18* (2013.01)

(58) Field of Classification Search
CPC ......... H04W 8/00; H04W 8/005; H04W 8/22; H04W 24/04; H04W 29/08; H04W 40/08; H04W 40/12; H04W 40/24; H04W 40/30; H04W 40/34; H04W 84/18; H04W 24/08; H04W 40/248; H04L 12/24; H04L 41/0813; H04L 41/12; H04L 67/1095; H04L 12/56; H04L 12/751; H04L 45/02; H04L 45/306; H04L 47/2433; H04M 1/2745; H04M 1/274533
See application file for complete search history.

(56) References Cited

U.S. PATENT DOCUMENTS

| | | | |
|---|---|---|---|
| 6,269,099 B1 | 7/2001 | Borella et al. | |
| 8,064,362 B2* | 11/2011 | Mekkattuparamban | H04L 45/04 370/254 |
| 8,982,785 B2* | 3/2015 | Pandey | H04W 8/005 370/328 |
| 2004/0073678 A1* | 4/2004 | Border | H04L 45/02 709/227 |
| 2005/0135286 A1* | 6/2005 | Nurminen | H04W 84/18 370/310 |
| 2008/0062866 A1 | 3/2008 | Jiang et al. | |
| 2008/0144587 A1* | 6/2008 | Gupta | H04W 40/248 370/338 |
| 2008/0253306 A1* | 10/2008 | Manion | H04L 45/02 370/255 |
| 2009/0040926 A1* | 2/2009 | Li | H04L 41/0893 370/230.1 |

(Continued)

*Primary Examiner* — Tri H Phan
(74) *Attorney, Agent, or Firm* — McNair Law Firm, P.A.

(57) ABSTRACT

A station of a mesh network comprising a peer table which is configured to list neighboring peers within the mesh network. Each peer comprises a qualification grade and the station comprises a controller which is configured to detect a new peer entering the mesh network and to establish a peer connection with the new peer. The controller is also configured to add the new peer to the peer table and to determine if the peer table is full when the new peer has been added. The controller is further configured to compare the qualification grades of the neighboring peers in the peer table if the peer table is full, and to remove a peer having a high qualification grade in relation to the neighboring peers in the peer table.

16 Claims, 5 Drawing Sheets

(56) References Cited

U.S. PATENT DOCUMENTS

| 2010/0046523 | A1  |        | 2/2010 | Mekkattuparamban et al. |
|--------------|-----|--------|--------|-------------------------|
| 2015/0172991 | A1  | *      | 6/2015 | Petersen ............... H04W 40/12 |
|              |     |        |        | 370/252 |
| 2015/0188975 | A1  | *      | 7/2015 | Hansen ............... H04L 67/1068 |
|              |     |        |        | 709/231 |
| 2016/0006848 | A1  | *      | 1/2016 | Halvarsson ......... H04L 67/1095 |
|              |     |        |        | 455/414.1 |

* cited by examiner

ENHANCED PEER DISCOVERY IN A MESH NETWORK

TECHNICAL FIELD

The present invention relates generally to the field of mesh networks. More particularly, it relates to peer discovery in mesh networks.

BACKGROUND

In a typical cellular network a base station or router keeps track of the communication in the cell and all nodes within the cell. The router or base station may typically relay communication between nodes.

A mesh network, on the other hand, is typically an ad hoc network. In such networks there is no base station or router keeping track of the nodes, nor controlling the communication between nodes. Instead the nodes themselves, or stations as they typically are referred to when dealing with mesh networks, keep track of each other by establishing peer connections and having peer tables. A peer is a neighboring station in the mesh network.

Mesh networks are typically dynamic with a network topology which may rapidly change in conjunction with stations entering and leaving the mesh network.

When a new station enters a mesh network, a handshake procedure is initiated with at least one of the stations currently in the network. When the handshake procedure is complete, both stations will have each other in its respective peer table. This is typically how stations within a network receive knowledge about other stations in the network.

Mesh networks have the capability to become very large which introduces difficulties in keeping track of all the stations within in the large network.

When the mesh network software stack is run on devices with a memory constraint, the number of slots in the peer table is typically limited. The limit is typically set to 8 slots.

This leads to a problem when the stations of a network have saturated their peer tables and new stations enter. The new stations may then form isolated mesh network clusters which typically lowers the mesh connectivity factor, since the total percentage of reachable mesh stations for any given station is lowered.

Therefore, there is a need for mesh network stations and methods that reduce the amount of clusters, reduce the risk of clusters forming and enhance the overall mesh connectivity.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

Cluster forming in a mesh network may typically occur when the stations in the mesh network have saturated their peer tables. If a new station enters the network, it will not be able to establish a peer connection with the peers having saturated peer tables. Thus the connectivity within the network is limited since groups of stations having saturated peer tables may only communicate with each other and not reach other stations, the group thus form a cluster.

It is an object of some embodiments to mitigate at least some of the above disadvantages and to provide a station of a mesh network and a method for a station in a mesh network.

According to a first aspect this is provided by a station of a mesh network comprising a peer table which is configured to list neighboring peers in the mesh network. Each listed peer comprises a qualification grade. The station also comprises a controller which is configured to detect if a new peer enters the mesh network and establish a peer connection with the new peer. The controller is also configured to add the new peer to the peer table, and to determine if the peer table is full when the new peer has been added.

The controller is further configured to compare the qualification grades of the neighboring peers in the peer table if the peer table is full, and to remove, from the peer table, a peer having a high qualification grade in relation to the neighboring peers in the peer table.

Thus, it is always ensured that there is an empty slot within the peer table so that a peer connection with new peers always may be established, and the risk of cluster forming is reduced.

In some embodiments, the qualification grade may be based on at least one of RSSI—Received Signal Strength Indicator—, packet error rate, number of path replies received for an established peer, last time data was received from the peer, number of established peers and/or number of throughputs utilized by the peer.

In some embodiments, the controller of the station is further configured to refrain from adding the peer that was removed from the peer table to the peer table again within a determined time period.

In some embodiments, the station comprise a timer which is configured to kept track of the determined time period during which a removed peer may not be added to the peer table again.

Having a time period during which a removed peer may not be added again ensures that no endless loop of adding and removing the same peer from the peer table is formed.

In some embodiments, the determined time period is dynamically set based on network parameters.

In some embodiments, the network parameters are at least one of number of peers in the network, amount of network traffic and amount of network resources.

A second aspect is a method for a station in a mesh network, wherein the station comprises a peer table which is configured to list neighboring peers and a qualification grade pertaining to each neighboring peer. The method comprises:

detecting that a new peer comprising a qualification grade enters the mesh network;

establishing a peer connection with the new peer;

adding new peer to the peer table;

determining if the peer table is full after adding the new peer; and if it is determined that the peer table is full comparing the qualification grades of the neighboring peers in the peer table; and removing, from the peer table, a peer having a high qualification grade in relation to the neighboring peers in the peer table.

A third aspect is a computer program product comprising a computer readable medium, having thereon a computer program comprising program instructions. The computer program is loadable into a data-processing unit and adapted to cause execution of the method according to the second aspect when the computer program is run by the data-processing unit.

A fourth aspect is a mesh network which comprises a plurality of stations according to the first aspect configured to carry out the method according to the second aspect.

It is to be noted that in some embodiments, the second and fourth aspects may additionally have features identical with or corresponding to any of the various features as explained above for the first aspect.

BRIEF DESCRIPTION OF THE DRAWINGS

Further objects, features and advantages will appear from the following detailed description of embodiments, with reference being made to the accompanying drawings, in which.

DETAILED DESCRIPTION

Like numbers refer to like elements throughout.

Figure 1A:
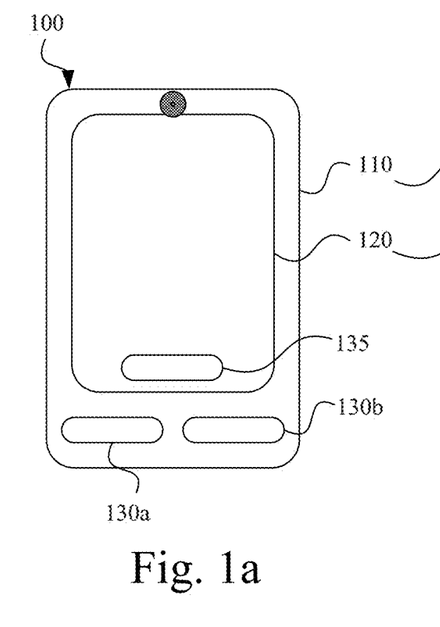
FIGS. 1a and 1b each illustrates a mesh station according to some embodiments.
Figure 1B:
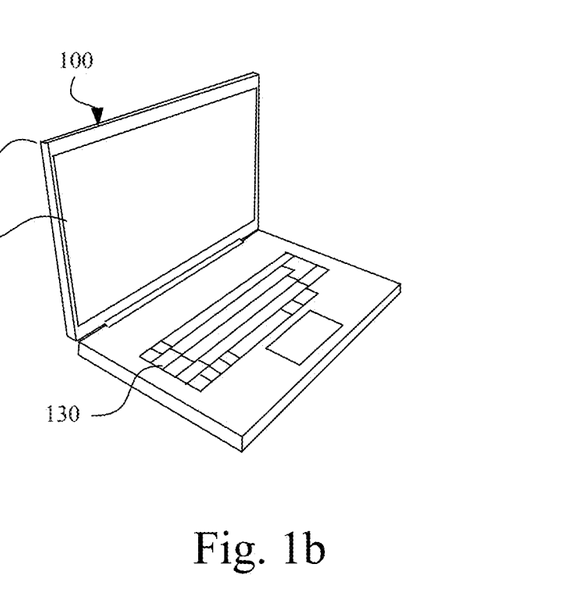

FIGS. 1a and 1b generally show a station 100 according to an embodiment herein. In one embodiment the station 100 is configured for wireless or radio frequency network communication for acting as a node in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1a and a laptop computer 100 in FIG. 1b.

Referring to FIG. 1a, a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1b, a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of input units are computer mouse, touch pads, touch screens or joysticks to name a few.

Figure 2:
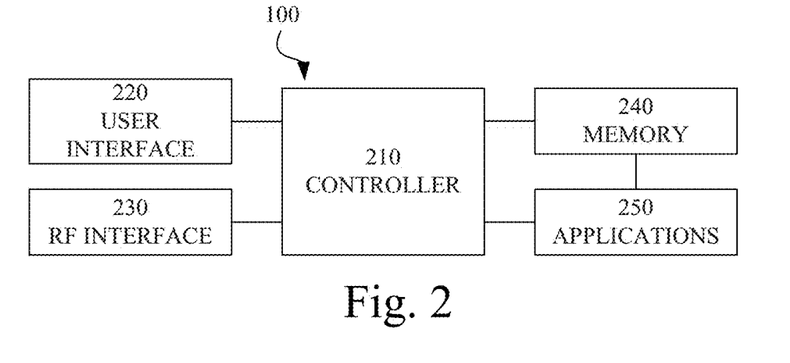
FIG. 2 illustrates an arrangement of a mesh station according to some embodiments.

FIG. 2 shows a schematic view of the general structure of a station according to FIGS. 1a and 1b. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1a and 1b is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11s, IEEE 802.11 Mesh and Bluetooth® to name a few. Other examples of radio technologies for example for communicating with devices outside the mesh network that may be implemented in a station 100 are W-CDMA, GSM, UTRAN, LTE, NMT to name a few.

Figure 3:
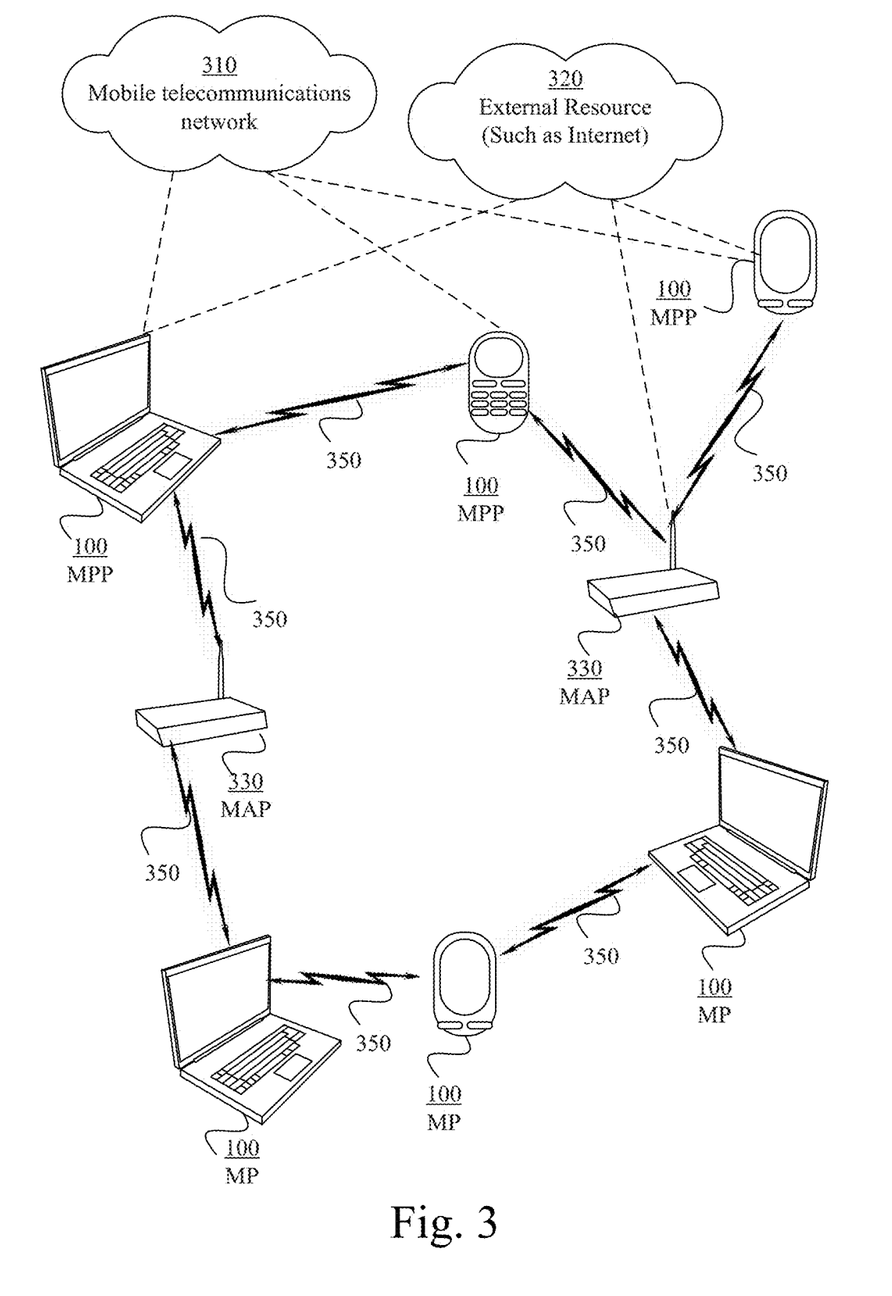
FIG. 3 illustrates a mesh network according to some embodiments.

FIG. 3 shows a mesh network 300. A mesh network 300 comprises a plurality of nodes which may be a station 100 as in FIGS. 1a, 1b and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11 Mesh standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1a and 1b, and supports a peer protocol for discovering neighboring nodes and maintaining an overview of them. In IEEE 802.11 Mesh this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 100 in a mesh network receive this information and each node 330, 100 is thus aware of its surrounding network environment.

The MPs also support a protocol for communicating with other nodes, nodes that are not necessarily neighbors to the MP. In IEEE 802.11 Mesh this peer protocol is called Hybrid Wireless Mesh Protocol (HWMP). It is hybrid because it supports two kinds of path selection protocols. In IEEE 802.11 Mesh the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11 Mesh should a path be broken this will be discovered after a time period (e.g. 5 s) when a sending node detects that reception is not acknowledged. The system then performs a rerouting procedure by sending out path requests (PREQ) as has been discussed in the background section.

The self-healing capability enables a routing-based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

If there e.g. is a constraint in memory on the devices which the mesh software stack is run, the number of peers that may be discovered is limited. This limitation is typically carried out by restricting the number of slots in the peer table of each station.

The limitation also typically results in isolated mesh network clusters of stations that have saturated their peer tables.

The inventors have after insightful reasoning realized that this may be avoided if the stations are configured to always keep one slot of the peer table empty.

When the peer table is full the station removes one of the entries. In order to decide which entry should be removed a qualification grade pertaining to each entry is introduced. The qualification grade may be an integer based on different parameters. Such parameters may e.g. be Received Signal Strength Indicator, RSSI, packet error rate, number of path replies received for an established peer, number of established peers and last time data was received from a peer and throughput(s) utilized.

Figure 4:
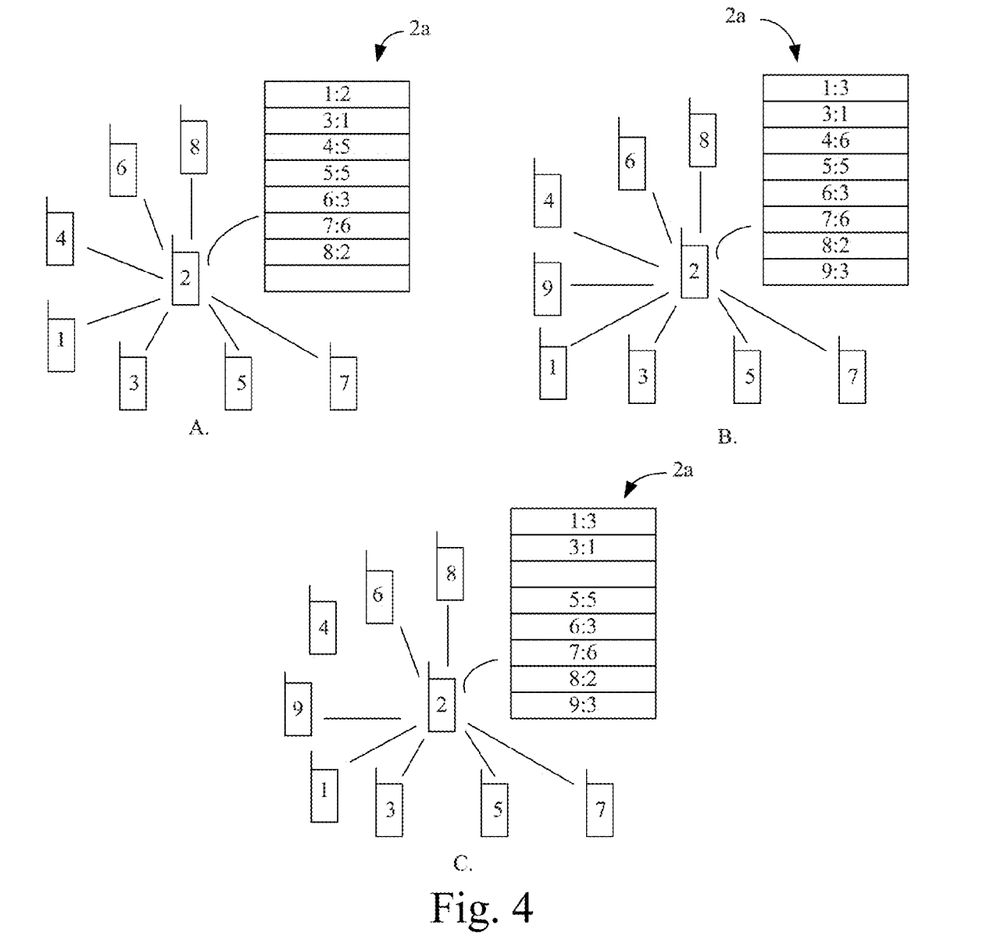
FIG. 4 illustrates a mesh network scenario according to some embodiments.

FIG. 4 illustrates an example mesh network according to some embodiments in three time instances referenced A, B and C. In instance A. of FIG. 4 eight stations 1, 2, 3, 4, 5, 6, 7 and 8 are present. The eight stations may for example each be any of the stations 100 as described in FIGS. 1a, 1b, 2 and 3.

The station 2 is connected to the stations 1, 3, 4, 5, 6, 7 and 8 which stations are comprised within a respective entry of the peer table 2a of station 2. Each entry in the peer table indicates the station and the qualification grade pertaining to that station. In the embodiment of FIG. 4 the qualification grade may be an integer corresponding to the number of established peers, i.e. how many other peers each peer is connected to. It is however to be understood that any of the qualification grades described above may be used. In FIG. 4, the notation used is X:Y, where X denotes the station being connected to and Y denotes the qualification grade for that station (X).

In instance B. of FIG. 4, a new station 9 enters the mesh network and connects, at least, to the station 2. The station 2 adds the station 9 as an entry in its peer table 2a along with a qualification grade pertaining to station 9. The peer table 2a is now full and the station 2 compares the qualification grades of each entry in order to find which entry that may be removed.

As the qualification grade in this example represents the number of peers each peer is connected to, the station 2 will search for an entry having a high qualification grade.

A high qualification grade indicates that the entry is connected to many peers. It is therefore likely that the station 2 still will be able to communicate with the removed station since the removed station probably is connected to another station which still is comprised in the peer table of the station 2 and a multi-hop path to the removed station may be used for such communication as is explained below.

In instance C. of FIG. 4, the station 2 has compared the entries of the peer table and decided to remove station 4 whose qualification grade indicated that station 4 has 6 neighbors (as seen in instance B.).

As indicated by the dotted line, station 6 still has station 4 in its peer table, and if station 2 needs to communicate with station 4, this may be done through station 6.

The algorithm thus uses the concept of multi-hop in order to work around the maximum number of connected nodes, thus the station 2 does not necessarily need to have a certain station in its peer table 2a, as the likelihood that there is a connection to the removed station through one or more of the remaining stations in the peer table is high.

Figure 5:
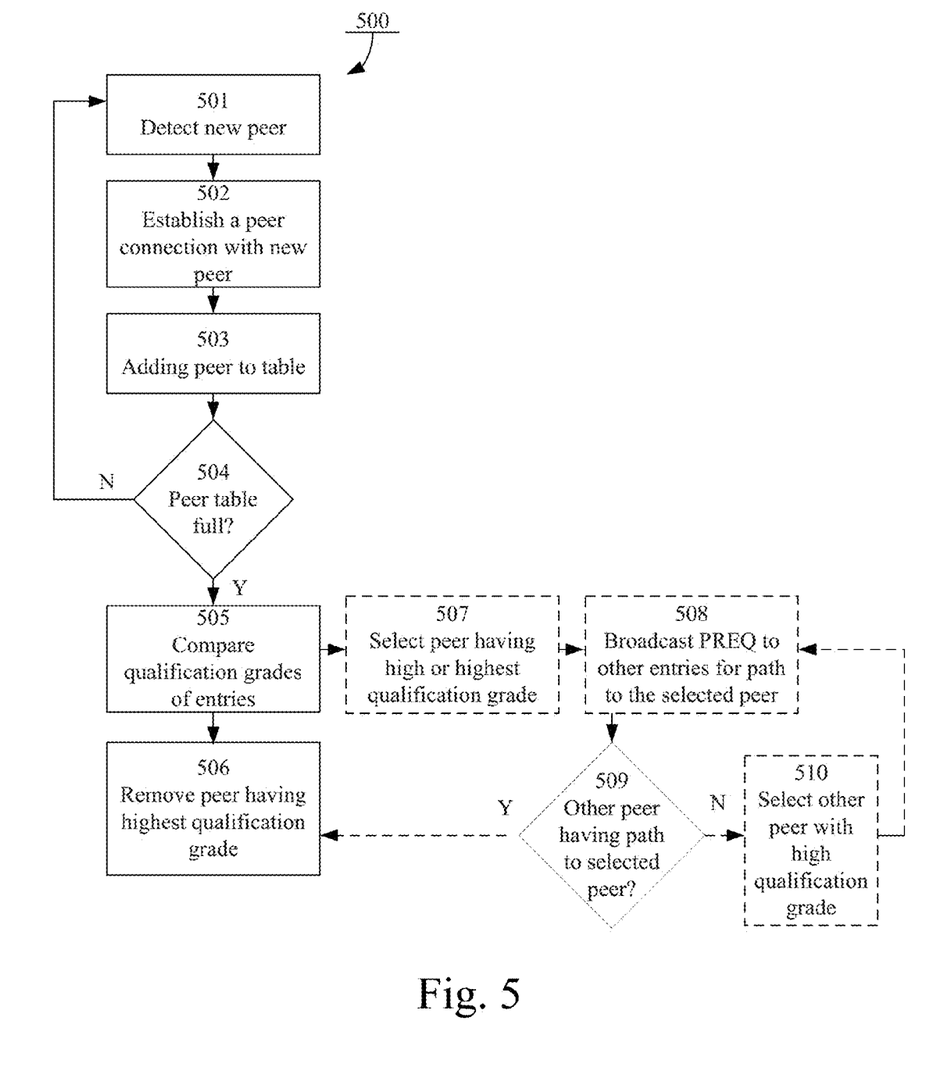
FIG. 5 is a block diagram illustrating method steps according to some embodiments.

FIG. 5 illustrates an example method 500 according to some embodiments. Method 500 begins in 501 where a first station, e.g. station 2 in FIG. 2 or any of the stations 100 in FIGS. 1, 2 and 3, detects a new peer entering the mesh (compare with B. in FIG. 4). The new peer may e.g. be station 9 in FIG. 2, or any of the station 100 in FIGS. 1, 2, and 3.

In 502 a peer connection is established between the first station and the new peer. The connection may e.g. be established through a hand shake procedure according to IEEE 802.11 Mesh standard.

When the peer connection is established, the method continues to 503 wherein the new peer is added to the peer table (compare with C. in FIG. 4).

The station then checks in 504 if the peer table is full. If the peer table is full (Y-path out of 504) then in 505, the first station compares the qualification grades pertaining to each entry in the peer table.

In 506, the first station removes the entry comprising the peer having high or the highest qualification grade.

In alternative embodiments, the station may also determine that qualification grades should be compared for finding a candidate to remove even when the table is not full, for example to leave two positions open to enable a faster addition of units in a quickly growing network.

If it is determined in 504 that the peer table is not full (N-path out of 504), then the method returns to 501 where a new peer may be detected.

In some embodiments, the first station may determine if the peer table is full upon detecting that a new peer has entered the network. If the peer table is not full, then the first station may proceed with establishing the peer connection and then adding the new peer to the peer table.

If it is detected that the peer table is full, the first station may first remove an entry based on the qualification grade before adding the new peer.

In some embodiments, the qualification grade may e.g. be represented by an integer ranging from 0 to 10. Other ranges and formats are of course possible. A high grade should be measured as high in relation to the other grades in peer table, such as being higher than the average, or higher than the majority, or higher than 75% of the stations in the list.

In some embodiments, the entry having a low or the lowest qualification grade in relation to the other entries may be removed.

In some embodiments, the qualification grade may be based on more than one parameter. E.g. the qualification grade may be based on number of peers and last time data was received from the peer. Then if several entries in the peer table have an equal number of peers, the reason for removal from the peer table may be based on the last time data was received from the peer. If e.g. data has not been received in a long time it may be an indication that the station has left the mesh network or that the link is broken and the peer may thus be removed from the peer table.

In some embodiments the station 2 is configured to, before removing a station, send out a path request to the stations in the peer table, other than that of the station to be removed, for finding an alternative path to the station to be removed. Alternatively a broadcasted path request message is sent out, ignoring any response from the station to be removed. If such a path is found, the station is removed. If no such path is found, the station 2 proceeds with finding another station to be removed, for example the station with the second highest or same highest qualification, such as the entry for station 7 in the example of FIG. 4.

This is illustrated by 507, 508, 509 and 510 in FIG. 5. This embodiment may be optional as indicated by the dashed lines in FIG. 5.

In 507 the station selects the peer having a high or the highest qualification grade comprised in the peer table. In 508 the station broadcast a PREQ to the other stations apart from the selected station comprised in the list. In 509, the station receives the path replies (PREP) from the other peers (and ignores any answer from the selected peer). If any one of the PREPs indicates that the other peers may reach the selected peer (Y-path out of 509), the station continues to 506 where the selected peer is removed from the peer table.

If none of the peers have a path to the selected peer (N-path out of 509), then the station continues to 510 where another peer having a high qualification grade is selected from the peer table.

In some embodiments, once a peer has been removed from the peer table, a timer may be set indicating a period of time wherein the station which removed the peer does not try to initiate a new peer contact with the removed peer. Thus it is avoided that a peer that was recently removed from the peer table is added again shortly after removal. If there was no time limit, a station may add a peer only to remove it instantly again when the peer table is full, and instantly add the peer again upon removal, resulting in an endless add-and-remove circle.

The time period during which the station refrains from initiating contact with the removed peer may vary. In active mesh networks, i.e. networks wherein the stations moves in and out of cover at a high rate, the time period may be set to seconds or minutes. In inactive mesh networks where the rate of the change of network topology is low, the time period may be set to hours or days.

The station may in some embodiments be configured to dynamically set the time period based on network parameters of the network the station currently is located in.

In some embodiments, such network parameters may e.g. be one or more of numbers of peers in the network, amount of network traffic and network resources.

Figure 6:
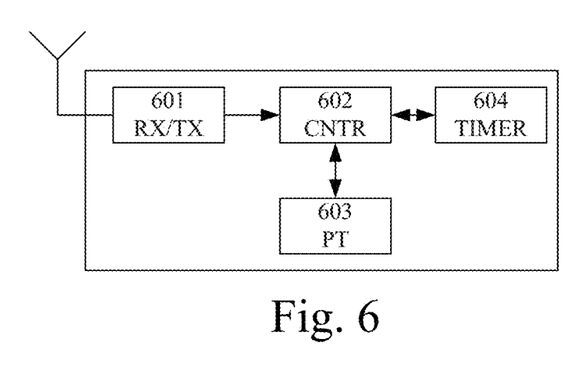
FIG. 6 illustrates an arrangement of a mesh station according to some embodiments.

FIG. 6 illustrates an arrangement 600 of a mesh station according to some embodiments. The station 600 may e.g. be any of the station 100 as described in FIGS. 1, 2, and 3, or the station 1-9 as described in FIG. 4.

The arrangement 600 comprises a transceiver, TX/RX, 601, a controller, CNTR, 602, a peer table, PT, 603 and a timer, TIMER, 604.

The peer table 604 may for example be the peer table 2a described in FIG. 4.

In some embodiments, the transceiver 601 may be a single receiver and a single transmitter.

A station comprising the arrangement 600 receives an indication from a peer that it whishes to communicate, e.g. by a path request (PREM) sent from the peer, through the transceiver 601 (compare 501 in FIG. 5). The controller 602 detects if it is a new peer by checking if the peer is present in peer table 603 or not.

If the peer is not comprised in the peer table 603 it is determined to be new and is added to the peer table 603 (compare 503 in FIG. 5). The controller is further configured to check if the peer table 603 is full (compare 504 in FIG. 5). If the peer table is full, the controller 602 is further configured to remove the peer having a high or the highest qualification grade (compare 506 in FIG. 5).

In some embodiments, the controller 602 is further configured to determine if the new peer has been removed from the peer table earlier, and if such, determine if the time period for refraining from adding the new peer to the peer table has expired by checking timer 604. If the time period has expired, the new peer is added. If the time period indicated by timer 604 has not expired, the new peer is not added.

In some embodiments, the controller 602 may check if the peer table 603 is full before adding the new peer. If the peer table 603 is full, the controller 602 is configured to remove the peer having a high or highest qualification grade.

In some embodiments, the qualification grade may be an integer based on different parameters. Such parameters may e.g. be Received Signal Strength Indicator, RSSI, packet error rate, number of path replies received for an established peer, number of established peers, last time data was received from a peer and throughput(s) utilized.

An advantage with the mesh network station and method as disclosed herein is that legacy mesh station hardware only needs a software upgrade in order to be able to participate in large mesh networks with high connectivity.

Figure 7:
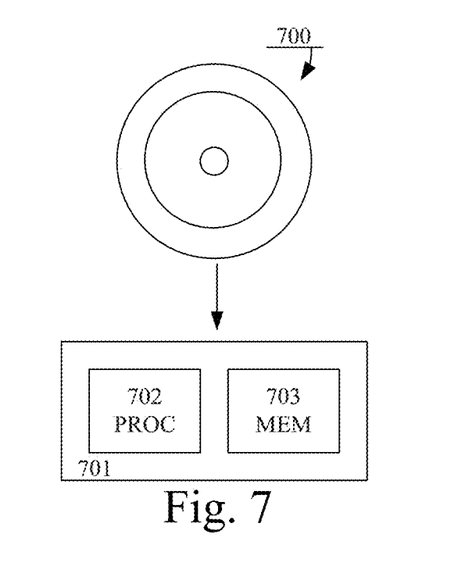
FIG. 7 illustrates a computer program product according to some embodiments.

FIG. 7 illustrates a computer readable medium 700 configured to have stored thereon computer program comprising program instructions. The computer readable medium is loadable into a data processing unit 701 comprising a processor, PROC, 702 and a memory, MEM, 703. When loaded into the data processing unit 701, the computer program may be stored in the memory 703. According to some embodiments, the computer program may, when loaded into and run by the data processing unit 701, cause the data processing 701 unit to execute method steps according to, for example, the method shown in FIG. 5.

A mesh network comprising stations configured to carry out the method according to the disclosed invention may be large, e.g. comprising tens or hundreds of stations, while still keeping good connectivity between the stations. The stations are memory efficient since they only use small peer tables with few, e.g. 8 entries. Mesh networks operating according to the current invention avoids isolating mesh stations because of peer table constraints, thus no clusters of isolated stations are created and the connectivity remains high.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A station of a mesh network comprising a peer table configured to list neighboring peers in the mesh network, wherein each peer comprises a qualification grade and wherein the station comprises
    a controller configured to detect a new peer entering the mesh network and to establish a peer connection with the new peer, wherein the controller is configured to add the new peer to the peer table and to determine if the peer table is full when the new peer has been added, and
    wherein the controller is further configured to compare the qualification grades of the neighboring peers in the peer table if the peer table is full, and to remove a peer having a high qualification grade in relation to the neighboring peers in the peer table, and
    wherein the controller is further configured to refrain from adding the peer that was removed from the peer table to the peer table again within a determined time period.

2. The station according to claim 1, wherein the qualification grade is based on at least one of RSSI—Received Signal Strength Indicator—, packet error rate, number of path replies received for an established peer, last time data was received from the peer, number of established peers and/or number of throughputs utilized by the peer.

3. The station according to claim 1, wherein the determined time period is dynamically set based on network parameters.

4. The station according to claim 3, wherein the network parameters are at least one of number of peers in the network, amount of network traffic and amount of network resources.

5. A method for a station in a mesh network, wherein the station comprises a peer table configured to list neighboring peers and a qualification grade, the method comprising detecting a new peer comprising a qualification grade entering the mesh network;
establishing a peer connection with the new peer;
adding the new peer to the peer table;
determining if the peer table is full after adding the new peer;
if it is determined that the peer table is full
    comparing the qualification grades of the neighboring peers in the peer table; and
    removing a peer having a high qualification grade in relation to the neighboring peers in the peer table, and
refraining from adding the peer that was removed from the peer table to the peer table again within a determined time period.

6. The method according to claim 5, wherein the qualification grade is based on at least one of RSSI—Received Signal Strength Indicator—, packet error rate, number of path replies received for an established peer, last time data was received from the peer, number of established peers and/or number of throughputs utilized by the peer.

7. The method according to claim 5, wherein the determined time period is dynamically set based on network parameters.

8. The method according to claim 7, wherein the network parameters is at least one of number of peers in the network, amount of network traffic and amount of network resources.

9. A computer program product comprising a computer readable medium, having thereon a computer program comprising program instructions, the computer program being loadable into a data-processing unit and adapted to cause execution of a method for a station in a mesh network, wherein the station comprises a peer table configured to list neighboring peers and a qualification grade, the method comprising
    detecting a new peer comprising a qualification grade entering the mesh network;
    establishing a peer connection with the new peer;
    adding the new peer to the peer table;
    determining if the peer table is full after adding the new peer;
    if it is determined that the peer table is full
        comparing the qualification grades of the neighboring peers in the peer table; and
        removing a peer having a high qualification grade in relation to the neighboring peers in the peer table; and
    refraining from adding the peer that was removed from the peer table to the peer table again within a determined time period.

10. The computer program product according to claim 9, wherein the qualification grade is based on at least one of RSSI—Received Signal Strength Indicator—, packet error rate, number of path replies received for an established peer, last time data was received from the peer, number of established peers and/or number of throughputs utilized by the peer.

11. The computer program product according to claim 9, wherein the determined time period is dynamically set based on network parameters.

12. The computer program product according to claim 11, wherein the network parameters is at least one of number of peers in the network, amount of network traffic and amount of network resources.

13. A mesh network, comprising a plurality of stations, each station comprising
    a peer table configured to list neighboring peers in the mesh network, wherein each peer comprises a qualification grade and wherein each station comprises
    a controller configured to detect a new peer entering the mesh network and to establish a peer connection with the new peer, wherein the controller is configured to add the new peer to the peer table and to determine if the peer table is full when the new peer has been added, and
    wherein the controller is further configured to compare the qualification grades of the neighboring peers in the peer table if the peer table is full, and to remove a peer having a high qualification grade in relation to the neighboring peers in the peer table, and
    wherein the controller is further configured to refrain from adding the peer that was removed from the peer table to the peer table again within a determined time period.

14. The mesh network according to claim 13, wherein the qualification grade is based on at least one of RSSI—Received Signal Strength Indicator—, packet error rate, number of path replies received for an established peer, last time data was received from the peer, number of established peers and/or number of throughputs utilized by the peer.

15. The mesh network according to claim 13, wherein the determined time period is dynamically set based on network parameters.

16. The mesh network according to claim 15, wherein the network parameters are at least one of number of peers in the network, amount of network traffic and amount of network resources.

* * * * *